United States Patent [19]
Veith

[11] 3,943,387
[45] Mar. 9, 1976

[54] PROCESS FOR MAKING A PIEZOELECTRIC BODY

[75] Inventor: Richard Veith, Unterhaching, Germany

[73] Assignee: Siemens Aktiengesellschaft, Berlin & Munich, Germany

[22] Filed: Mar. 28, 1974

[21] Appl. No.: 455,592

[30] Foreign Application Priority Data
Mar. 29, 1973 Germany............................ 2315767

[52] U.S. Cl.................. 310/8; 310/9.5; 317/262 F; 29/25.35
[51] Int. Cl.².................. H01L 41/04; H04R 17/00
[58] Field of Search........... 310/8, 8.5, 8.6, 9.5, 9.6; 317/262 F; 29/25.35; 252/62.9

[56] References Cited
UNITED STATES PATENTS

| | | | |
|---|---|---|---|
| 1,886,234 | 11/1932 | Meissner............................ | 310/8 X |
| 1,969,379 | 8/1934 | Meissner............................ | 310/8 X |
| 2,420,652 | 5/1947 | Chilowsky........................... | 310/8 X |
| 2,434,143 | 1/1948 | Chilowsky........................ | 310/9.7 X |
| 2,533,140 | 12/1950 | Rodriguez.......................... | 310/8 X |
| 3,070,775 | 12/1962 | Andrews, Jr...................... | 310/8 UX |
| 3,213,027 | 10/1965 | Fatuzzo et al. .................... | 310/8 X |

*Primary Examiner*—Mark O. Budd
*Attorney, Agent, or Firm*—Hill, Gross, Simpson, Van Santen, Steadman, Chiara & Simpson

[57] ABSTRACT

Process for the production of a piezoelectric body which contains a ferroelectric material which may be polarized in an aligned, permanent fashion and also contains a bonding material, the process comprises mixing a bonding material selected so that at least in a temperature range below the Curie temperature of the ferroelectric material, it has a specific electric conductivity $\sigma_B > E_C \times \sigma_K/E_B$, where $\sigma_K$ is the specific conductivity of the ferroelectric material, $E_C$ is the coercivity field strength of the ferroelectric material, and $E_B$ is the electric breakdown field strength of the bonding material with a granular ferroelectric material having a known Curie temperature, forming a desired body shape from such mixture, heating the resultant body to a temperature at least sufficient for the bonding material to exhibit its specific conductivity and applying an electric voltage of sufficient intensity to the body to produce a permanent polarization alignment in the ferroelectric material within such body.

17 Claims, 2 Drawing Figures

PROCESS FOR MAKING A PIEZOELECTRIC BODY

BACKGROUND OF THE INVENTION

The invention relates to a process for producing a piezoelectric body which contains a ferroelectric material which may be polarized in an aligned, permanent fashion, and which also contains a bonding material.

In the production of piezoelectric ceramics by sintering appropriate starting materials, it is known to employ organic bonding agents in the dross. These bonding agents are converted into a volatile state during the sintering process and are no longer present in the finished material.

A French Pat. No. 2,005,462 (which corresponds to British Pat. Specifications 1,266,143; 1,266,144 and 1,266,145) discloses mixing powdery, ferroelectric material with a synthetic resin as bonding agent, and the manufacture of piezoelectric bodies therefrom. In this case, the bonding agent remains, as such, in the finished piezoelectric body.

It has been established that a mixed body composed of a ferroelectric material and a bonding material cannot be polarized in a satisfactory fashion and, in particular, cannot be polarized in a determinate fashion. The term "polarization" as used herein is to be understood as meaning the fundamentally unidirectional alignment of permanently existing polarizations of elementary domains of the ferroelectric material, as a result of the application of an electric voltage or the introduction of the material into an electric field.

SUMMARY OF THE INVENTION

The present invention provides a novel process for the production of a piezoelectric body which contains a ferroelectric material which may be polarized in an aligned permanent fashion and which also contains a bonding material which is selected as being one which, in a temperature range below the Curie temperature of the ferroelectric material has a specific conductivity of $\sigma_B > E_C \times {}_K\sigma E_B E_B$, where $\sigma_K$ is the specific conductivity of the ferroelectric material, $E_C$ is the coercivity field strength of the ferroelectric material, and $E_B$ is the electric breakdown field strength of the bonding material. The body being produced thereby is brought or heated to at least the temperature at which the aforesaid conductivity condition of the bonding material prevails. At least at this temperature, an electric voltage necessary to produce a permanent polarization alignment of the ferroelectric material is applied.

The present invention also is directed to a novel product produced by the above described novel process.

BRIEF DESCRIPTION OF THE DRAWINGS

The drawings included herewith diagrammatically illustrate a piezoelectric body produced in accordance with the process of the present invention, and further illustrate the manner in which the permanent polarization is aligned.

DESCRIPTION OF A PREFERRED EMBODIMENT

Figure 1:
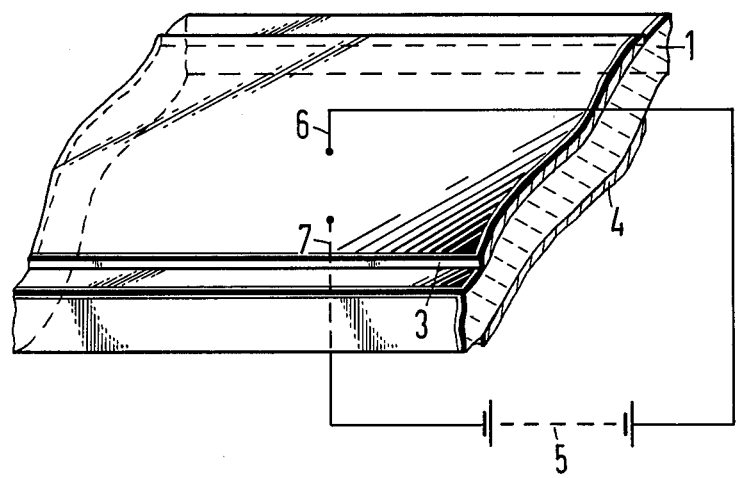
FIG. 1 of the drawings shows a piezoelectric body according to the invention as a fragmentary perspective view.

The novel process of the present invention is characterized by the fact that a bonding material B is selected, which, at least in a temperature interval below the Curie temperature of a ferroelectric material K, has a specific electric conductivity $\sigma_B > E_C \times \sigma_K/E_B$ where $\sigma_K$ is the specific conductivity of the ferroelectric material, $E_C$ is the coercivity field strength of the ferroelectric material, and $E_B$ is the electric breakdown field strength of the bonding material. Such a bonding material is mixed with a granular ferroelectric material having a known Curie temperature and a desired cohesive body shape, for example a thin film, is manufactured therefrom. Thereafter the body is heated to a temperature at which the aforementioned conductivity condition prevails, and further that at least at this temperature, the electric voltage necessary to produce the alignment of the permanent polarization of the ferroelectric material, is applied.

The value of the specific electric conductivity $\sigma_B$ of the bonding material should be selected to be so low that on the application of the minimum electric voltage (generally an intensity sufficient to heat the mixed body to a temperature below 100° C), required to achieve the desired alignment of the permanent polarization of the ferroelectric material, during the necessary duration of the application of the voltage, the mixed body is not traversed by an electric current of such magnitude that the mixed body, in particular the bonding material, would suffer damage due to overheating.

Preferably the specific electric conductivity $\sigma_B$ is selected in accordance with the equation $\sigma_B = n \times \sigma_K$ wherein $n$ is an integer ranging from 0.1 to 100.

When the body is used as piezoelectric transducer, in particular in the case of high frequency excitation, it can be of advantage to use a bonding material which, at room temperature, has a specific electric conductivity in accordance with the equation $\sigma_B = m_x \epsilon_0 \times \epsilon_K/T$, where $\epsilon_K$ is the dielectric constant of the ferroelectric material, T is the duration period or pulse duration of the excitation voltage, and m is a value between 0.1 and 10. It is thus ensured that the applied excitation voltage drops across the ferroelectric granules to a substantial extent.

The bonding material is preferably an organic synthetic material.

Together, with a piezoelectric material on a base of lead-zirconate-titanate with a magnesium niobium additive, it has proved advantageous to use an epoxy resin, such as Araldite D, with a hardener such as HY 956 produced by the Ciba Company. This hardener is a triethylenetetramine which is oxymethylized with nitrogen. The mixture of the aforementioned materials is hardened at temperatures of around 80°C. At these temperatures, the specific electric conductivity of the piezoelectric material and of the Araldite is approximately equal, and amounts to approximately $10^{10}$ ohm-cm. At room temperature the aforementioned bonding material is approximately four grades more ohmic than the aforementioned piezoelectric material. A metal oxide or a mixture of such oxides, e.g., a glass, can also be used as bonding material.

Preferably, in the case of a bonding material which is already very hard or stiff at the instant of polarization, it is advantageous to employ a piezoelectric material which suffers a relatively slight change of shape during the polarization, i.e., during the uniform alignment of existing permanent dipoles. Such a material is e.g., a Perowskit composed of lead-zirconate-titanate with a lead magnesium-niobium complex component. If the selected bonding material does not already inherently exhibit the suitable value of electric conductivity at the temperature of the polarization process, it is advisable to add to the bonding material a homogeneous component which allows the desired electric conductivity to be reached.

For the process in accordance with the invention, a granular, ferroelectric material is used. For various purposes of use, it can be advantageous to use a specific granularity. For example, in an application as piezoelectric plate in a device for recording the instantaneous location of a recording probe as disclosed in U.S. Pat. No. 3,790,709, it is advantageous to have a granularity with granule dimensions which are considerably smaller than the acoustic wave length in the piezoelectric material of the plate. By homogeneously distributing fine granule material of this type the straying of the continuous acoustic wave can be kept very low.

Also in a piezoelectric ceramic sintered body, straying of acoustic waves has been established on granules of the material. On the other hand, however, it has not previously been possible to provide very small granule sizes, e.g., in the order of $1 \mu m$ in a sintered body, without the piezoelectric properties, in particular the degree of the polarization alignment, being considerably smaller than in rough crystalline sintered bodies.

In a mixed body in accordance with the process of this invention, however, even in the event of small granules, for example, having a diameter ranging from 0.1 to $1 \mu m$, a high degree of alignment of the permanent dipoles in the electric polarization field is achieved. In particular, in accordance with the process of this invention, it is, for example, possible to use lead titanate as the ferroelectric material, it being known that the latter as a sintered body, can be polarized (i.e., permanently aligned) only to a small extent. In accordance with the process of the invention, lead titanate can be used in a very advantageous fashion as lead titanate is not a mixed crystal and it also has an inherent very high spontaneous polarization. Other ferroelectric materials can also be processed accordingly, by the process in accordance with the invention, to form piezoelectric bodies for which this ferroelectric material is not suitable as a sintered body.

It has been established that the process of grinding in order to achieve the granular ferroelectric material for the execution of the process in accordance with the invention involves drops in spontaneous polarization in the ground material as compared with the values of the sintered starting material. An increased electric conductivity of the granules was also established on occasion. It has been discovered, in accordance with a further development of the invention, that as a result of tempering the ground ferroelectric material, the favorable electromechanical values of the starting material are practically regained. The tempering is carried out at temperatures so far below the sintering temperature that the granularity is not lost.

A piezoelectric mixed body produced by a process in accordance with the invention in particular, can be in the form of a thin layer whose thickness is, for example, only a few $\mu m$. It is of advantage for the execution of the polarization if the granule size is approximately equal to the layer thickness. In particular, the layer can be applied to a base. The layer is preferably produced by rolling.

As already mentioned above, unsatisfactory results occurred when mixed bodies were produced via prior art techniques from a ferroelectric material and bonding material. Intensive investigations as to the cause of this established that the insufficiently high polarization, i.e., insufficiently uniform alignment of existing permanent polarization in elementary zones of the ferroelectric material, and the drastically differing degree of the total polarization achieved is due to the fact that the ferroelectric material and the bonding material have electrical properties which are considerably different to one another. It was established that by adapting the electric properties of the materials to one another, as in accordance with the invention, i.e., by selecting a suitable bonding material, the failures which previously occurred can be entirely eliminated.

In accordance with the invention, the polarization is carried out at a temperature which, in particular, is below the Curie temperature of the ferroelectric material. When selecting this temperature, it is advisable also to take into account any special polarization properties of the ferroelectric material with respect to the polarization temperature.

Since synthetic bonding material has a conductivity which, with increasing temperature, increases considerably more than that of the ferroelectric material here in question, it may, as has been established by experiments, be advantageous to select a particularly suitable polarization temperature at which the specific conductivity of the bonding material and the specific conductivity of the ferroelectric material are in agreement, in accordance with the above equation.

During the polarization process, in which an electric voltage of sufficient magnitude is applied to the mixed body, and effects the mixed body, an ohmic voltage distribution occurs between the bonding agent and the ferroelectric material. When bonding material and ferroelectric material possess equal resistance values, the field strength in the ferroelectric material is at least approximately equal to that in the bonding material. At room temperature, however, a synthetic material as described has a highly insulating effect.

A preferred use of a mixed body produced as in accordance with this invention is for a piezoelectric membrane foil in a microphone. Another particularly advantageous use is that as a plate of piezoelectric material in a device for recording the instantaneous location of a recording probe in accordance with U.S. Pat. No. 3,790,709. Precisely for the latter use, a body produced by the process in accordance with the invention is suitable in the form of a thin layer which is preferably applied, for example, rolled onto a base plate serving to conduct an acoustic wave. This layer is of very fine granules, while still retaining good piezoelectric properties; for example, the layer may include granular ferroelectric material having a granule size of between 0.1 and $1 \mu m$, and, as mentioned above, exhibit minimalized acoustic straying. A plate consisting of aluminum, for example, of about a thickness of $1 \mu m$ has proved advantageous as base plate. To this base plate was applied an approximately $100 \mu m$ thick layer composed of a mixture of lead-zirconate-titanate with a lead-magnesium-niobium - complex component, as known from "Journal of the American Ceramic Society" Volume 48, No. 12, page 630 with DER 332, silane A187 and isophorondiamine as bonding material, and then hardened.

For the practical use of a piezoelectric mixed body produced in accordance with this invention, it is advantageous if such body has as large as possible a volume component of the ferroelectric material. A high volume component is achieved, for example, by the following process: The ferroelectric granular material is mixed with the desired quantity of a hardenable synthetic resin as bonding material and with a solvent. By the addition of the solvent, even small quantities of synthetic resin are uniformly distributed among the granules. When the solvent has evaporated, the mixture of synthetic resin and ferroelectric material is pressed into the determined shape and subsequently hardened.

Figure 2:
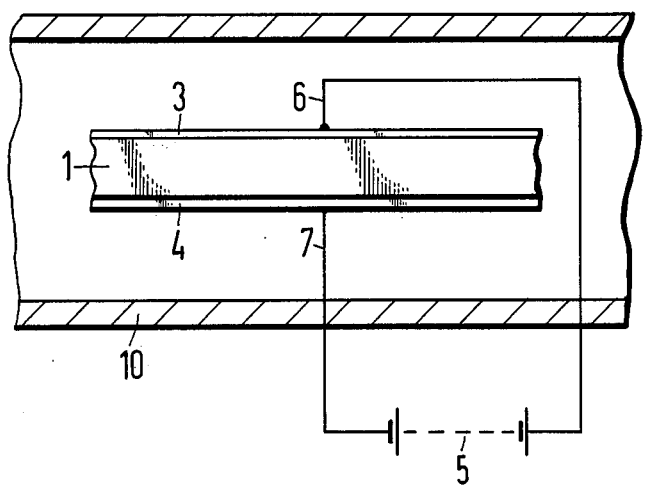
FIG. 2 shows the piezoelectric body of FIG. 1 in a side view partially in section and partially diagrammatically, inside of a heating chamber in the form of a tubular body.

The piezoelectric body produced in accordance with the method above described and the manner in which permanent polarization alignment is obtained is shown in FIGS. 1 and 2 of the drawing. In these drawings, piezoelectric body 1 is provided with preliminary electrodes 3 and 4. A DC voltage source 5 is then connected through conductors 6 and 7 to the preliminary electrodes 3 and 4. The voltage from source 5 is of a value sufficient to provide for the alignment of the permanent polarization. The electrodes 3 and 4 may later be removed from the body 1. In FIG. 2, a tubular body 10 is shown which provides a heating chamber in which the piezoelectric body 1 is raised to a predetermined temperature necessary for polarization.

It will be apparent to those skilled in the art that many modifications and variations may be effected without departing from the spirit and scope of the novel concepts of the present invention.

I claim as my invention:

1. A process for producing a piezoelectric body which may be polarized in an aligned permanent fashion comprising:

mixing a select amount of a granular ferroelectric material having a Curie temperature greater than 200° C. with a sufficient amount of a fluidized bonding material to bind said granular ferroelectric material into a cohesive body, said bonding material being characterized by a specific conductivity below said Curie temperature of the ferroelectric material in accordance with the formula $$\sigma_B \quad E_C \times {}_K/E_B$$

wherein $\sigma_B$ is the specific conductivity of the bonding material;

$E_C$ is the coercive field strength of the ferroelectric material;

$\sigma_K$ is the specific conductivity of the ferroelectric material; and $E_B$ is the electric breakdown field strength of the bonding material;

shaping said mixture into a solid predetermined body shape; heating said solid body to a temperature sufficient to exhibit said specific conductivity in the bonding material but below said Curie temperature of the ferroelectric material; and applying an electric voltage of sufficient intensity to said heated solid body to produce a permanent polarization alignment in the ferrorelectric material within said solid body but below that required to heat damage the bonding material.

2. A process as defined in claim 1 wherein the specific conductivity $\sigma_B$ of the bonding material is determined in accordance with the equation:

$$\sigma_B = n \times \sigma_K$$

wherein $n$ is an integer ranging from 0.1 to 100.

3. A process as defined in claim 1 wherein the application of electric voltage to produce a permanent polarization alignment in the ferroelectric material within the solid body occurs while the solid body is maintained for at least one minute at a temperature sufficient for the bonding material to exhibit the specific conductivity thereof.

4. A process as defined in claim 3 wherein the application of electric current to produce a permanent polarization alignment in the ferroelectric material within the solid body occurs while the solid body is maintained at a temperature sufficient for the bonding material to exhibit the specific conductivity thereof and for a time period sufficient to establish a basically constant electric current through the solid body.

5. A process as defined in claim 1 wherein the applied electric voltage is of an intensity sufficient to only heat the solid body to a temperature below 100° C.

6. A process as defined in claim 1 wherein the granular ferroelectric material is subjected to a tempering process prior to mixing such material with the bonding material, said tempering process occurring at a temperature below that required to sinter such granular material into a mass and loose the grnularity thereof.

7. A process as defined in claim 1 wherein the bonding material comprises an organic synthetic material.

8. A process as defined in claim 7 wherein the organic synthetic material comprises an epoxy resin.

9. A process as defined in claim 1 wherein the granular ferroelectric material is formed of individual granules having a diameter ranging from 0.1 to 1 $\mu$m.

10. A process as defined in claim 1 wherein the bonding material exhibits a specific conductivity at room temperature in accordance with the equation:

$$\sigma_B = m \times E_0 \times E_K/T$$

wherein $E_K$ is the dielectric constant of the ferroelectric material; T is the time period for the applied electric voltage; and $m$ is an integer ranging from 0.1 to 10.

11. A process as defined in claim 1 wherein the bonding material includes a homogeneously distributed electrically conductive component in an amount sufficient to achieve the specific conductivity of the bonding material.

12. A process as defined in claim 1 wherein the bonding material is dissolved in a suitable solvent therefore prior to mixing with the granular ferroelectric material and the solvent is evaporated prior to shaping such mixture into a solid predetermined body shape.

13. A process as defined in claim 1 wherein the shaping of the mixture into a solid predetermined body shape includes pressing the mixture into a desired body shape and hardening such pressed body shape.

14. A process as defined in claim 1 wherein the shaping of the mixture into a solid predetermined body shape comprises applying the mixture as a layer onto a base plate.

15. A process as defined in claim 14 wherein application of the mixture as a layer onto a base plate is accomplished by rolling.

16. A process as defined in claim 14 wherein the base plate is composed of aluminum.

17. A process as defined in claim 1 wherein the granular ferroelectric material is composed of lead titanate.

* * * * *